(12) United States Patent
Kim

(10) Patent No.: US 6,208,868 B1
(45) Date of Patent: Mar. 27, 2001

(54) EXPANDED COMMUNICATION METHOD IN CORDLESS TELEPHONE SYSTEM

(75) Inventor: Kyung-Wook Kim, Kumi (KR)

(73) Assignee: Samsung Electronics Co., Inc. (KR)

( * ) Notice: Subject to any disclaimer, the term of this patent is extended or adjusted under 35 U.S.C. 154(b) by 0 days.

(21) Appl. No.: 09/141,788

(22) Filed: Aug. 28, 1998

(30) Foreign Application Priority Data

Aug. 28, 1997 (KR) .................................................. 97-41902

(51) Int. Cl.[7] ........................................................ H04Q 7/26
(52) U.S. Cl. .......................... 455/463; 455/465; 455/525; 455/528
(58) Field of Search .................................... 455/465, 463, 455/462, 464, 403, 422, 515, 524, 525, 554, 555, 528

(56) References Cited

U.S. PATENT DOCUMENTS

| 5,329,575 | * | 7/1994 | Matsuda | 455/463 |
| 5,475,736 | * | 12/1995 | Ito | 455/463 |
| 5,513,248 | * | 4/1996 | Evans et al. | 455/465 |
| 5,559,861 | * | 9/1996 | Takehisa | 455/462 |

* cited by examiner

*Primary Examiner*—Fan Tsang
*Assistant Examiner*—Philip J. Sobutka
(74) *Attorney, Agent, or Firm*—Dilworth & Barrese, LLP

(57) ABSTRACT

A communication method in a cordless telephone system having a base unit with which a plurality of portable units can be registered, and a portable unit registrable with a plurality of base units. In the method, if the base unit goes off-hook for requesting a call, a busy signal is sent to all the portable units registered with the base unit. If the call is terminated in the base unit, a call termination signal is sent to all the portable units. Upon reception of the busy signal, a portable unit stores data indicating that the base unit is busy in a selection table of a memory. For initiating a call, the portable unit sends a call request signal to a primary base unit listed in the selection table if the primary base unit is not busy, and otherwise, to another idle base unit. When a call termination signal is received from the busy base unit, the busy state indicating data is deleted in the selection table.

9 Claims, 5 Drawing Sheets

EXPANDED COMMUNICATION METHOD IN CORDLESS TELEPHONE SYSTEM

BACKGROUND OF THE INVENTION

1. Field of the Invention

The present invention relates to a cordless telephone system, and in particular, to a communication method in a cordless telephone system.

2. Description of the Related Art

A cordless telephone system is typically composed of a base unit which is connected to a central office line and a portable unit for communicating with the base unit or with a different wired/cordless telephone while a user roams within a predetermined area. Though one portable unit is generally registered with a base unit, the number of registered portable units per base unit can be increased. That is, in addition to a portable unit provided with the base unit, another portable unit can be purchased and registered with the base unit. In this manner, two or more portable units are registered with a single base unit. Use of a portable unit registered with a base unit allows a user to conveniently communicate without moving to the location of the base unit.

Many homes and offices currently use two or more telephones by connecting the telephones in parallel to a single telephone line or by connecting the phones to different telephone lines. In the first case, the telephones are assigned an identical phone number so that only a single call can be performed by a subscriber at a given time. In the latter case, each telephone line is assigned its own phone number, and each line can support a call.

In using a cordless telephone system in the above cases, one or more portable units are registered with a base unit and a call with a portable unit is performed via the base unit. Therefore, when two or more portable units are registered to a base unit, a first user cannot make a call with a portable unit when the base unit is engaged in a call from a second user with another portable unit. This results in inconvenience to the user who must wait to initiate a call or perform the call on another telephone system.

SUMMARY OF THE INVENTION

An object of the present invention is to provide a communication method in a cordless telephone system having a base unit and at least two portable units registered with the base unit, which allows a communication even when the base unit is busy.

To achieve the above object, there is provided a communication method in a cordless telephone system having a base unit with which a plurality of portable units can be registered, and a portable unit registrable with a plurality of base units. In the method, if the base unit goes off-hook thereby requesting a call, a busy signal is sent to all the portable units registered with the base unit. When the call is terminated in the base unit, a call termination signal is sent to all the portable units. Upon reception of the busy signal, a portable unit stores data indicating that the base unit is busy in a selection table of a memory. To initiate a call, the portable unit sends a call request signal to a primary base unit listed in the selection table if the primary base unit is not busy, and otherwise, to another idle base unit to which the portable unit is registered. When a call termination signal is received from the busy base unit, the busy state indicating data is deleted in the selection table.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

Figure 1:
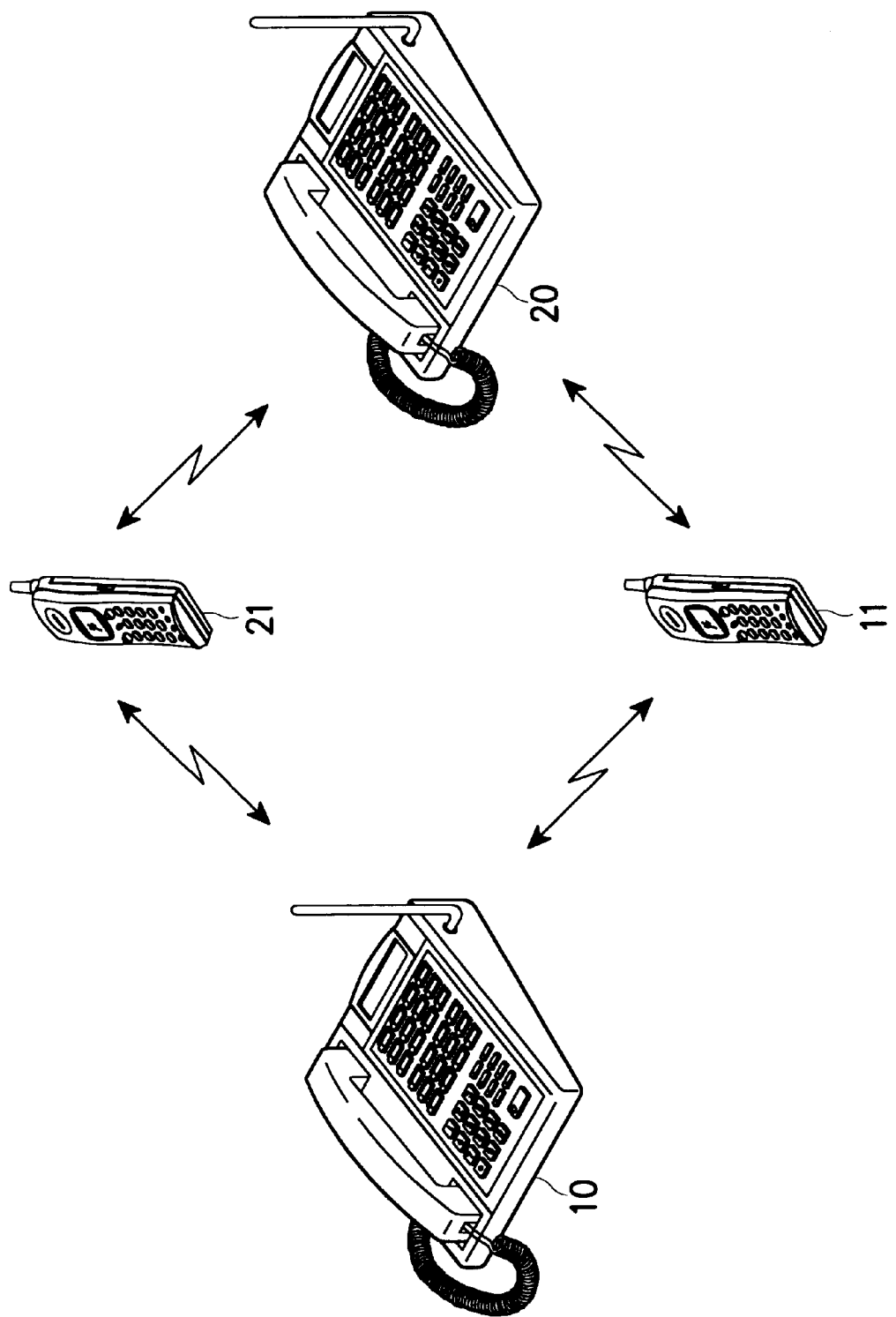
FIG. 1 is a view illustrating portable units commonly registered with two cordless telephone base units according to an embodiment of the present invention.

FIG. 1 illustrates multiple base units and multiple portable units in use in a cordless telephone system according to an embodiment of the present invention.

Portable units 11 and 21 are registered commonly with base units 10 and 20 which are connected to a central office through different telephone lines in an embodiment of the present invention. The portable units 11 and 21 can conduct communications via either of the base units 11 and 21. This configuration is applicable to DECT (Digital European Cordless Telephone) as well as other, general cordless telephone systems.

Figure 2:
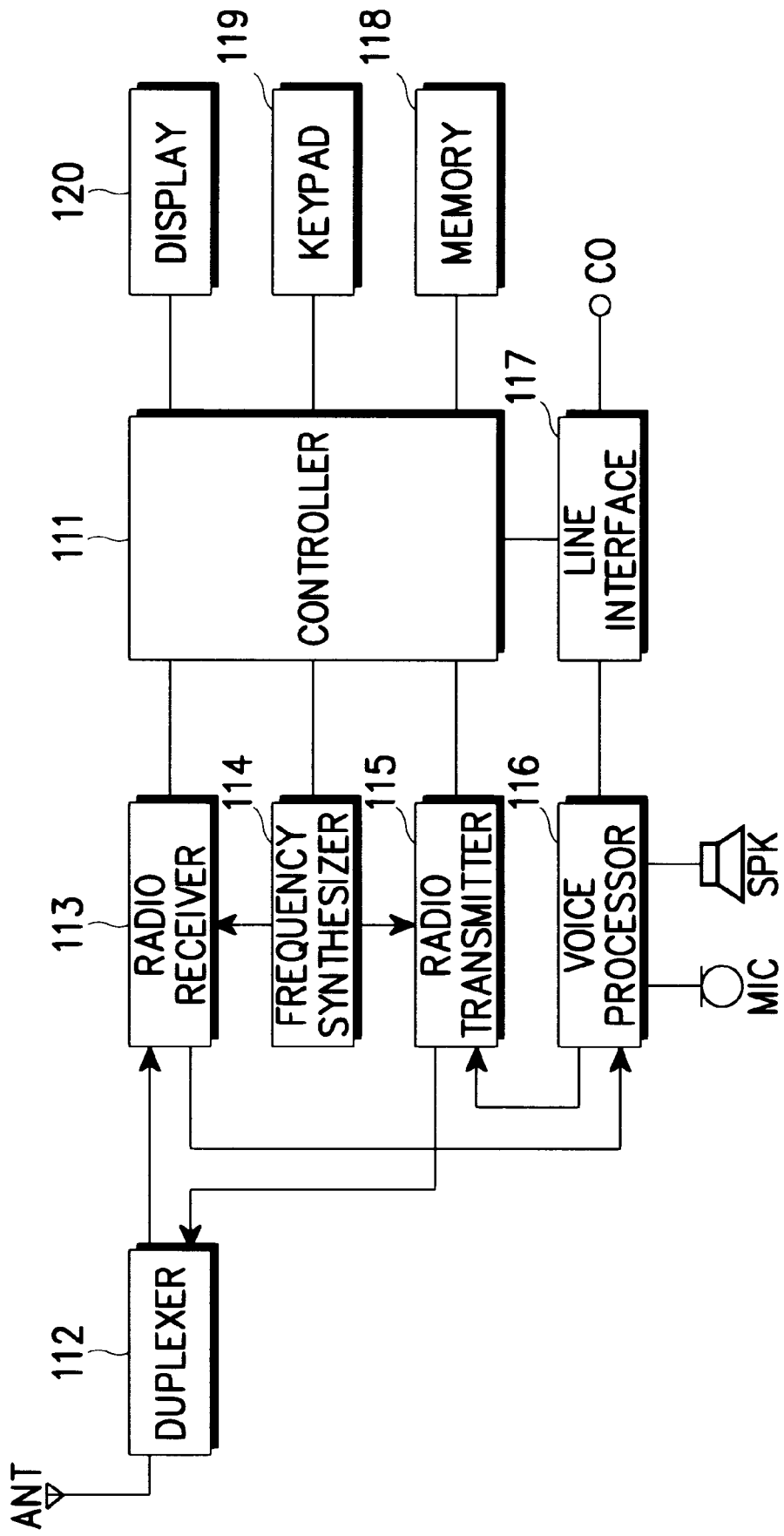
FIG. 2 is a block diagram of a base unit in a cordless telephone system, to which the present invention is applied.

FIG. 2 is a block diagram of a cordless telephone base unit to which the present invention is applied. Referring to FIG. 2, a controller 111 controls the operation of the base unit, and more particularly, causes a busy signal to be sent to all portable units registered with the base unit when a handset of the base unit (not shown) is taken off-hook, thereby generating a request to use the base unit. A duplexer 112 is interposed between an antenna ANT and both a radio receiver 113 and radio transmitter 115. The duplexer 112 filters a predetermined frequency band in a radio signal received via an antenna ANT and provides the filtered signal to the receiver 113. The duplexer 112 also receives a radio signal generated by the radio transmitter 115 and couples this signal to the antenna ANT.

The radio receiver 113 receives a local oscillation frequency signal (LO) from a frequency synthesizer 114. The receiver mixes the LO signal with the radio signal received from the duplexer 112 and provides a resultant output signal to a voice processor 116 or the controller 111 under the control of the controller 111. The frequency synthesizer 114 generates the local oscillation frequency under the control of the base unit controller 111. The radio transmitter 115 receives data from the controller 111 or the voice processor 116 and a local oscillation frequency signal from the frequency synthesizer 114. The radio transmitter 115 outputs a modulated signal to the duplexer 112 under the control of the controller 111.

The voice processor 116 converts data received from the radio receiver 113 to an electrical voice signal and outputs the electrical voice signal to a speaker SPK under the control of the controller 111. The voice processor 116 also encodes an electrical voice signal received via a microphone MIC and outputs the encoded data to the radio transmitter 115 under the control of the controller 111. A line interface 117 connects a user handset (not shown) to a central office line in an off-hook state and outputs an off-hook signal to the controller 111.

A memory 118 includes a program memory, such as read only memory (ROM, not shown) for storing programs necessary for operating the base unit and a data memory, such as random access memory (RAM, not shown) for storing data generated during performing the programs. A keypad 119 has a key matrix structure (not shown), for generating a key input signal corresponding to a user key input and providing the key input signal to the controller 111. A display 120 displays the operation and state of the base unit under the control of the controller 111.

Figure 3:
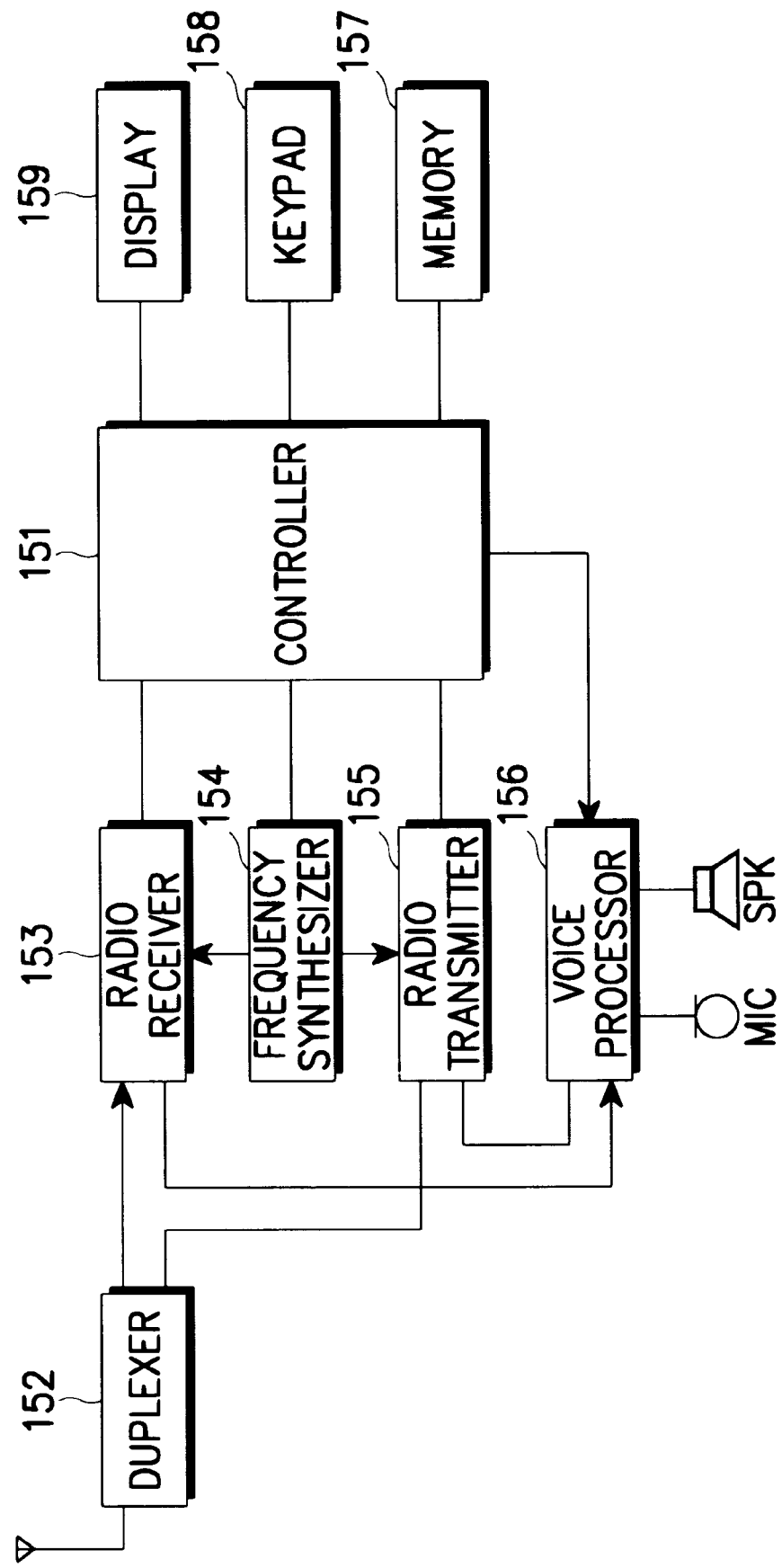
FIG. 3 is a block diagram of a portable unit to which the present invention is applied.

FIG. 3 is a block diagram of a portable unit to which the present invention is applied. Referring to FIG. 3, a controller 151 controls the operation of the portable unit. Particularly, when a primary base unit is busy and the portable unit is to initiate a call, the controller 151 switches the portable unit to a secondary base unit with which it is registered. A duplexer 152, a radio receiver 153, a frequency synthesizer 154, a radio transmitter 155? and a voice processor 156 perform the same operations as those of their respective counterparts in the base unit of FIG. 2. A memory 157 stores programs necessary for operating the portable unit and data generated during a control operation. A keypad 158 and a display 159 are operated in a similar manner as their respective counterparts in the base unit.

Figure 4:
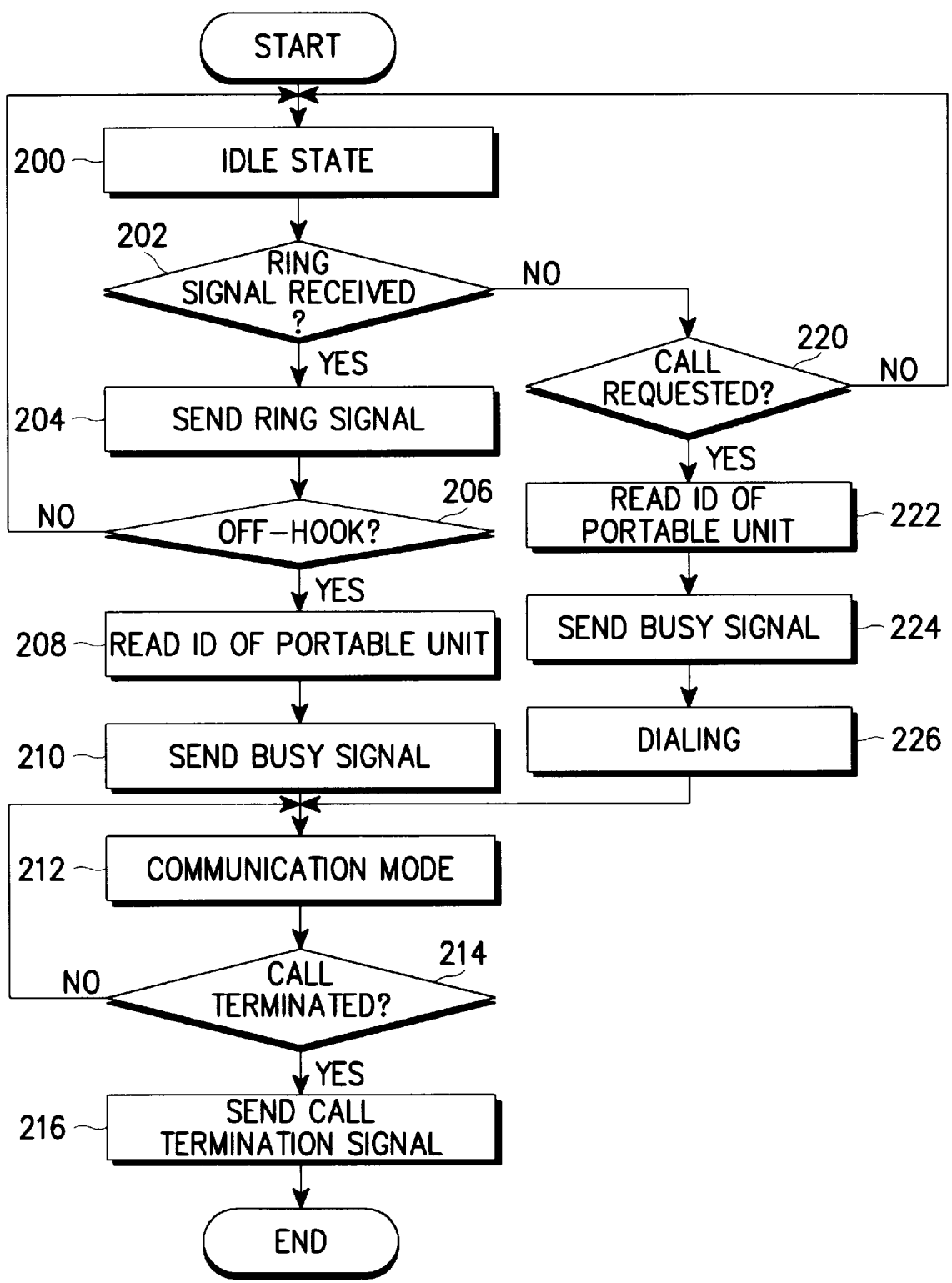
FIG. 4 is flowchart of a control operation in the base unit according to an embodiment of the present invention.

FIG. 4 is a flowchart of a call control operation in the base unit according to an embodiment of the present invention. The call control operation in the base unit will be described below referring to FIGS. 1 to 4. The controller 111 is initially set to an idle state in step 200. From the idle state, the controller 111 determines whether a ring signal is received via the line interface 117 in step 202. When a ring signal is received in step 202, the controller 111 sends the ring signal to the portable units 11 and 21 via the radio transmitter 115, the frequency synthesizer 114, and the speaker SPK, in step 204.

In the absence of the ring signal, the controller 111 determines whether a new call has been requested (step 220). A call request can be initiated from the handset of the base unit going off-hook or by receipt of a call request signal generated from one of the portable units 11 or 21. In either case, when a call is requested, the controller 111 advances to step 222. In the absence of a call request from either the base unit or the portable units 11 and 21, the controller returns to the idle state of step 200.

After sending the ring signal in step 204, the controller 111 determines whether a portable unit or the base unit handset is in an off hook condition (step 206). Upon detection of an off-hook signal from the base unit, the controller 111 reads the IDs (identifications) of all registered portable units 11, 21 from the memory 118. If the off-hook signal is from a portable unit 11, 21, the controller 111 reads the ID of the other portable unit(s) from the memory 118 (step 208). The controller 111 then controls the radio transmitter 115 and the frequency synthesizer 114 to send a radio signal indicative of a busy signal to the portable unit(s) (step 210) not sending the off-hook signal. In step 212, the controller 111 enters a communication mode, wherein a call is connected with the unit generating the off-hook signal. During the communication mode, the controller 111 monitors the call to determine whether the current call has been terminated (step 214). Upon detection of the call termination state, the controller 111 sends a call termination signal to the other portable unit(s) in step 216 and ends the control procedure.

Returning to step 220, when a call request signal is received from one portable unit 11, 21, the controller 111 reads the ID of the other portable unit(s) from the memory 118 in step 222. Alternatively, if the base unit handset is hooked off in step 220, the controller 111 reads the IDs of all the portable units 11, 21 registered with the base unit, in step 222. The controller 111 then sends a busy signal to the portable unit(s) by controlling the frequency synthesizer 114 and the radio transmitter 115, in step 224.

To perform a dialling operation, the controller 111 generates a DTMF (Dual Tone Multifrequency) signal in response to a dialing signal received from the radio receiver 113 or a key input signal received from the keypad 119. The controller 111 outputs the DTMF signal to the line interface 117 (step 226).

Though the controller 111 can transmit user request signals for using various high-level functions besides a call request signal from a portable unit, the call request signal is taken here as an example among the user request signals for clarity of the description.

To summarize the operation in the flowchart referring to FIG. 1, upon reception of a ring signal, the base unit sends the ring signal to the portable units 11 and 21 and outputs a ring tone via the speaker SPK of the base unit. When the base unit 10 goes off-hook, the base unit 10 sends a busy message to the portable units 11 and 21. On the other hand, if the portable unit 21 is hooked off, the base unit 10 sends a busy signal to the portable unit 11. Similarly, if the portable unit 11 is hooked off, the base unit 10 sends a busy signal to the portable unit 21.

Upon reception of a call request signal from portable unit 21 in the absence of a ring signal, the base unit 10 sends a busy signal to the other portable unit(s) 11. If the call request signal is received from portable unit 11, the base unit 10 sends the busy signal to the other portable unit(s) 21. In addition, when a user hooks off the base unit 10 to initiate a call, the base unit 10 sends a busy signal to the portable units 11 and 21.

Figure 5:
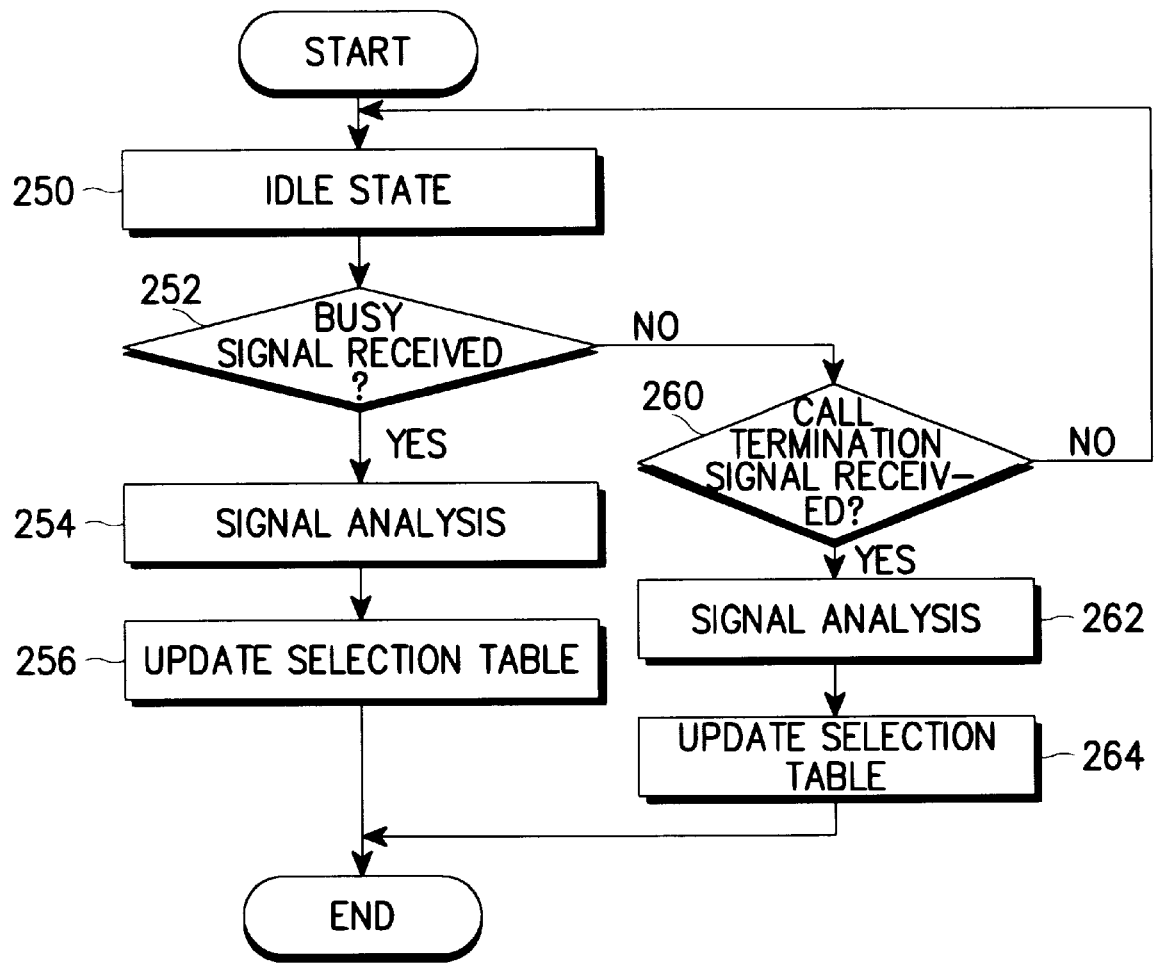
FIG. 5 is a flowchart of a control operation for a portable unit to receive a busy signal and a call termination signal according to an embodiment of the present invention.

FIG. 5 is a flowchart of a control operation involved for a portable unit to receive a busy signal and a call termination signal according to the embodiment of the present invention.

The control operation for a portable unit to receive a busy signal or a call termination signal from a base unit will now be described with reference to FIGS. 1 to 5. The controller 151 is set to an idle state in step 250, and determines whether a busy signal is received via the radio receiver 153 in step 252. Upon reception of the busy signal, the procedure advances to step 254. If no busy signal is detected, the operation proceeds to step 260 where the controller 151 determines whether a call termination signal is received via the radio receiver 153. Upon reception of the call termination signal, the controller 151 goes to step 262. Otherwise, control returns to step 250. If a busy signal is received in step 252, the controller 151 analyzes the received busy signal in step 254, determines the identification (ID) of a base unit which sent the busy signal, and indicates a busy state for the identified base unit in a selection table (step 256); An exemplary selection table is shown below in table 1.

TABLE 1

|  | Primary Base Unit | Secondary Base Unit |
| --- | --- | --- |
| Communication State | 1 | 0 |

Each portable unit is preferably assigned to a different primary base unit.

That is, the base units 10 and 20 are designated as primary and secondary base units, respectively, for the portable unit 11 of FIG. 1. Similarly, the base units 20 and 10 act as primary and secondary base units, respectively, for the portable unit 21. When a base unit state is set to 1 in Table 1, it implies that the portable unit received a busy signal from the corresponding base unit. When the base unit state is reset to 0, it implies that the portable unit did not receive a busy signal from the corresponding base unit or has since received a call termination signal from that base unit. The portable unit sends a calling signal to the primary base unit when the primary base unit is not busy. When the primary base unit is busy, the portable unit then attempts to establish a call on the secondary base unit.

If in step 260 a call termination signal is received by the portable unit, the controller 151 analyzes the received call termination signal (step 262) to determine the ID of the base unit which sent the call termination signal. The controller then advances to step 264 to update the selection table. The controller 151 resets the communication state of the base unit to 0 representing that the base unit is idle in the selection table according to the analysis and ends the procedure. The described base unit switching method for a portable unit can be applied to DECT (Digital European Cordless Telephone) as well as other portable phone systems.

As described above, when a base unit is busy, a portable unit is automatically switched to another base unit in a cordless telephone system, so that a call can be conveniently made without further user key manipulation.

While the present invention has been described in detail with reference to the specific embodiment, it is a mere exemplary application. Thus, it is to be clearly understood that many variations can be made by anyone skilled in the art within the scope and spirit of the present invention.

What is claimed is:

1. A communication method in a cordless telephone portable unit registrable with a plurality of base units and having a selection table for storing information on the communication states of a primary base unit and secondary base units, comprising the steps of:

updating the selection table upon reception of a control signal indicative of the communication state of a base unit with which the portable unit is registered from the base unit;

checking idle base units in the selection table when the portable unit is to initiate a call; and performing a call via the primary base unit if the primary base unit is idle.

2. The communication method of claim 1, further comprising the step of performing a call via another idle base unit if the primary base unit is busy.

3. The communication method of claim 1, wherein the selection table updating step comprises the substeps of:

setting a base unit to a busy state in the selection table upon reception of a busy signal from the base unit; and setting the base unit to an idle state in the selection table upon reception of a call termination signal from the base unit.

4. A cordless telephone system comprising:

a first base unit operatively coupled to a first telephone line;

at least a second base unit operatively coupled to at least a second telephone line;

a first portable unit, one of said first and at least second base units being a primary base unit for said first portable unit; and at least a second portable unit, one of said first and at least second base units not being a primary base unit for said first portable unit being a primary base unit for said at least second portable unit, said first and at least second portable units establishing calls with said primary units when the assigned primary unit is not in a busy state and establishing calls with another available base unit when the primary unit is in a busy state.

5. A cordless telephone system as defined by claim 4, wherein said first base unit and said at least second base unit further comprise:

means for detecting a busy state of said base unit;

means for transmitting a signal indicative of said busy state of said base unit; and means for transmitting a second signal indicative of said busy state being terminated.

6. A cordless telephone system as defined by claim 5, wherein said first portable unit and second portable unit further comprise:

means for receiving said signal from said base unit indicative of a busy state of said base unit;

means for storing said busy state of said base unit; and means responsive to said stored busy state for directing a call to an available base unit.

7. A cordless telephone system as defined by claim 6, wherein said first portable unit and second portable unit further comprise:

means for receiving said second signal from said base unit indicative of a busy state of said base unit being terminated;

means for storing said busy state of said base unit being terminated; and means responsive to said stored busy state being terminated for directing a call to the available primary base unit.

8. A communication method in a cordless telephone system having a base unit with which a plurality of portable units can be registered, and a portable unit registrable with a plurality of base units, comprising the steps of:

sending a busy signal to all portable units registered with the base unit upon detection of a call request signal from the base unit;

sending a busy signal to the other portable units except for a specific portable unit upon reception of a call request signal from the specific portable unit;

sending a call termination signal to the other portable units except for the specific portable unit upon reception of a call termination signal from the specific portable unit; and performing a call.

9. The communication method of claim 8, further comprising the step of sending a call termination signal to all the portable units registered with the base unit when the call is terminated in the base unit.

* * * * *